United States Patent [19]

Noguchi et al.

[11] Patent Number: 5,715,086
[45] Date of Patent: Feb. 3, 1998

[54] IMAGE-SHAKE CORRECTING DEVICE

[75] Inventors: Kazuhiro Noguchi; Hironori Takano, both of Kanagawa, Japan

[73] Assignee: Canon Kabushiki Kaisha, Tokyo, Japan

[21] Appl. No.: 26,742

[22] Filed: Mar. 5, 1993

[30] Foreign Application Priority Data

Mar. 9, 1992 [JP] Japan .................... 4-050624
Jun. 17, 1992 [JP] Japan .................... 4-181612

[51] Int. Cl.$^6$ .................................. G02B 27/64
[52] U.S. Cl. ................... 359/557; 359/554; 359/832
[58] Field of Search ............................ 359/557, 554, 359/832, 665

[56] References Cited

U.S. PATENT DOCUMENTS 5,117,246   5/1992   Takahashi et al. ............... 354/202
5,243,462   9/1993   Kobayoshi et al. ............... 359/557

*Primary Examiner*—Do Hyun Yoo
*Attorney, Agent, or Firm*—Fitzpatrick, Cella, Harper & Scinto

[57] ABSTRACT

The present invention relates to an improvement in an image-shake correcting device which has a light deflecting unit having two opposed surface portions and a bag-like structure filled with a liquid having transparency, the light deflecting unit deflecting light passing therethrough by inclining at least one of the two surface portions. In the aforesaid device, there is provided a supporting member for supporting the at least one surface portion of the light deflecting unit while allowing the at least one surface portion to swing around an axis, each of the two surface portions being a substantially equal distance from the axis. Accordingly, it is possible to prevent a reaction force from occurring on a bearing located on the swinging center axis of the surface portion and increasing driving load.

12 Claims, 12 Drawing Sheets

IMAGE-SHAKE CORRECTING DEVICE

BACKGROUND OF THE INVENTION

1. Field of the Invention

The present invention relates to an improvement in an image-shake correcting device having image-shake correcting optical means, such as a variable angle prism, for optically correcting an image shake.

2. Description of the Related Art

In recent years, photographic apparatus, such as still cameras or video cameras, have been increasingly automated, and a wide variety of photographic apparatus having automatic exposure mechanisms or automatic focus adjustment mechanisms have been put into practice. To advance the automation of such a photographic apparatus and further enhance the multifunctional performance thereof, several approaches for realizing an image-shake correcting function to correct an image shake caused by a shake of the photographic apparatus itself have been put into practice. The image-shake correcting function is intended to prevent the performance of an optical apparatus from being impaired by the problem that a temporal variation in the relative position between the optical apparatus and a subject appears as a shake of an optical image to be photographed, measured or observed.

As one method for realizing such an image-shake correcting function, a system has been proposed which employs a variable angle prism capable of varying its apex angle to vary the deflection angle of light rays passing therethrough. FIG. 11 is a view schematically showing a known variable angle prism assembly, and FIG. 12 is a schematic view showing a state in which the apex angle of the known variable angle prism assembly is varied. The assembly shown in these figures includes transparent plates $1a$ and $1b$ made of glass or plastic, frames $2a$ and $2b$ bonded to the respective transparent plates $1a$ and $1b$, reinforcing rings $3a$ and $3b$ for the respective frames $2a$ and $2b$, and a bellows-like film 4 for connecting the frames $2a$ and $2b$. An internal space formed by the aforesaid constituent elements is filled with a transparent liquid 5 of high refractive index, thus forming a variable angle prism. This variable angle prism is clamped between holding frames $26a$ and $26b$, and the transparent plates $1a$ and $1b$ are held swingably around a yaw axis $27a$ and a pitch axis $27b$ by two pins $28a$, $29a$ and two pins $28b$, $29b$ (not shown), respectively. The yaw axis $27a$ and the pitch axis $27b$ are orthogonal or approximately orthogonal (hereinafter referred to simply as "substantially orthogonal") to each other.

However, in the aforesaid conventional example, since the yaw axis $27a$ and the pitch axis $27b$ are located at positions away from the central plane of the variable angle prism, a driving load increases and a friction due to the side pressure of a swinging-motion supporting part bearing varies, with the result that it is difficult to realize a smooth swinging motion. In other words, since the variable angle prism is symmetrical, the swinging center of the transparent plates of the variable angle prism assembly is located substantially at the mechanical center (the point A shown in FIGS. 11 and 12) of the variable angle prism the point A is not a fixed point owing to a manufacturing error or the low rigidity of the bellows-like film 4 in the thickness direction thereof). However, as shown in FIG. 12, since each surface portion of the variable angle prism swings around the yaw axis $27a$ or the pitch axis $27b$ (the shown swinging center B) away from the mechanical center, an unnatural deformation occurs in the bellows-like film 4 and the resultant reaction force causes the above-described problems.

SUMMARY OF THE INVENTION

It is, therefore, an object of the present invention to solve the above-described problems.

To achieve the above object, in accordance with one aspect of the present invention, there is provided an improved image-shake correcting device which has light deflecting means having two opposed surface portions and a bag-like structure filled with a liquid having transparency, the light deflecting means deflecting light passing therethrough by inclining at least one of the two surface portions. The improved device comprises a supporting member for supporting the at least one surface portion of the light deflecting means while allowing the at least one surface portion to swing around an axis passing through the center or an approximate center of the two surface portions. The at least one surface portion is inclined by being swung around the axis. Accordingly, it is possible to prevent a reaction force from occurring on a bearing located on the swinging center axis of the surface portion and increasing driving load, whereby the surface portion can be smoothly swung.

According to another aspect of the present invention, there is provided an improved image-shake correcting device which has light deflecting means having at least one surface portion and a bag-like structure filled with a liquid having transparency, the light deflecting means deflecting light passing therethrough by inclining the at least one surface portion. The improved device comprises supporting means for supporting the at least one surface portion of the light deflecting means while allowing the at least one surface to swing around a particular axis and to slide with respect to the supporting means in a surface direction of the at least one surface portion. In the aforesaid improved device, loss of driving force on the particular axis during a swinging motion of the surface portion around the particular axis can be eliminated to prevent deterioration of an image-shake correcting function. As a method for providing support using the above-described supporting means, for example, an elastic member is provided between the surface portion and the supporting means for urging the surface portion and the supporting means in directions perpendicular to the surface direction of the surface portion, whereby the surface portion and the supporting means can be relatively displaced in the surface direction and cannot be relatively displaced in the directions perpendicular to the surface direction.

In accordance with another aspect of the present invention, there is provided an improved image-shake correcting device which has image-shake correcting optical means for deflecting light passing therethrough by making a motion in an optical path, and driving means for causing the image-shake correcting optical means to make the motion. The improved device comprises motion detecting means for detecting the motion of the image-shake correcting optical means, and decision means for causing the driving means to forcedly move a part of the image-shake correcting optical means to a plurality of ends of a movable range, causing the motion detecting means to detect motions of the image-shake correcting optical means when the image-shake correcting optical means is located at the plurality of ends of the movable range, and determining a moving center of the image-shake correcting optical means on the basis of a plurality of outputs provided by the motion detecting means when the image-shake correcting optical means is located at the plurality of ends of the movable range. According to the improved arrangement, it is possible to determine more accurately the center of the movable range of the image-shake correcting optical means, and since the center of the movable range can be accurately determined, it is possible to control more accurately operations of the image-shake correcting optical means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

An image-shake correcting device according to the present invention is widely applicable to interchangeable lenses for attachment to imaging apparatus such as photographic cameras or video cameras, particularly, single-lens reflex cameras, and is further applicable to various optical apparatus including binoculars and a telescope. Since these optical apparatus are known, the following description will refer to only the portion of such an optical apparatus which is associated with an image-shake correct function.

Figure 1:
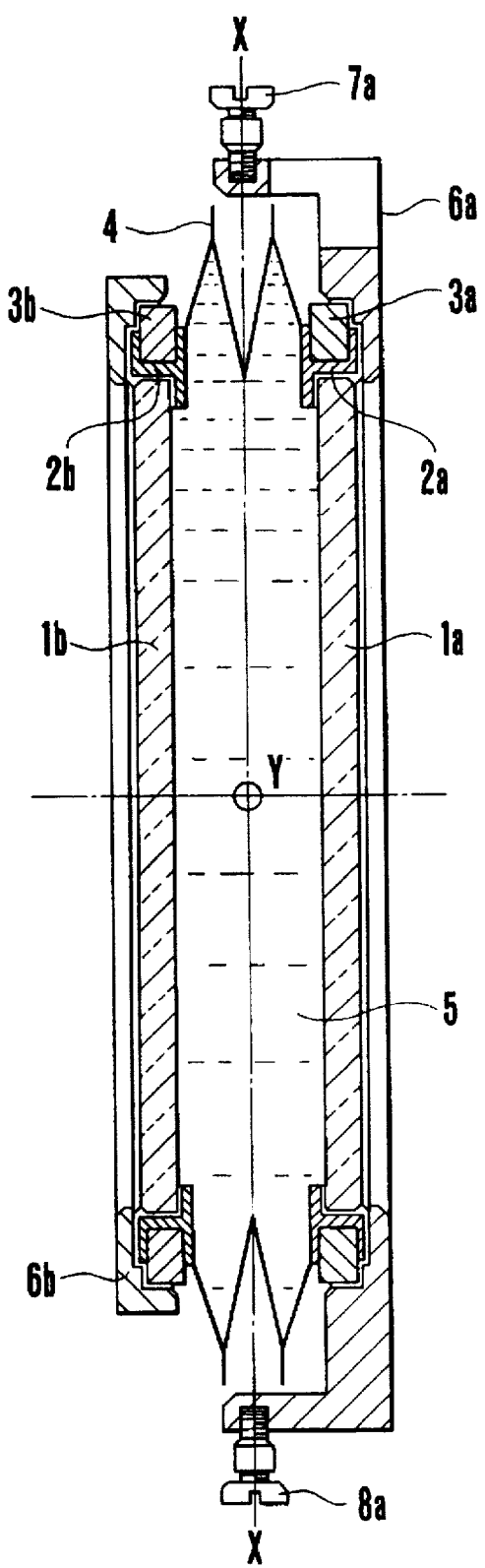
FIG. 1 is a diagrammatic, vertical sectional view showing the essential arrangement of a variable angle prism assembly according to a first embodiment of the present invention.
Figure 2:
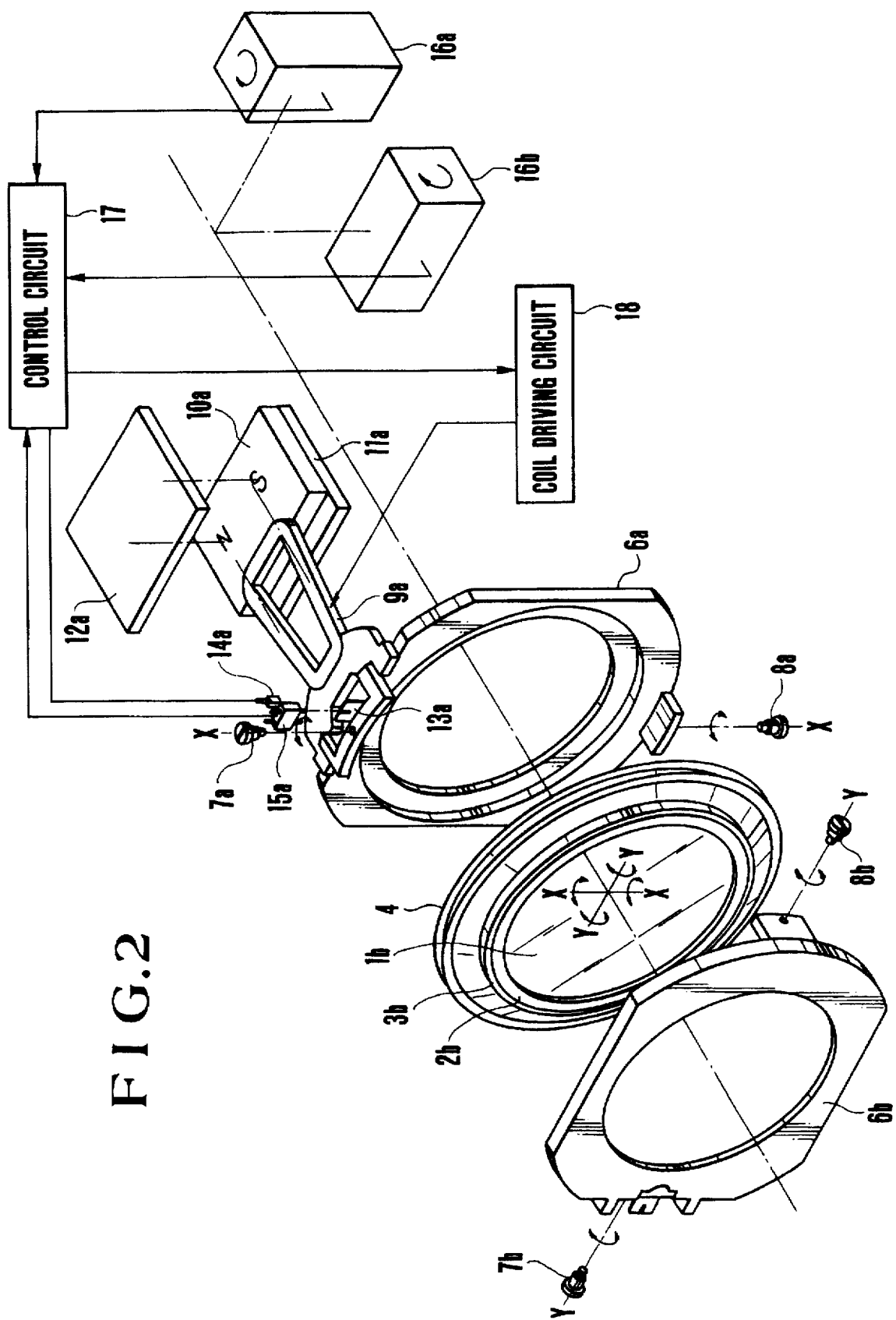
FIG. 2 is an exploded, perspective view diagrammatically showing the structure of an image stabilizing system which utilizes the variable angle prism assembly shown in FIG. 1.

FIGS. 1 and 2 are diagrammatic views showing a first embodiment of the present invention. The first embodiment will be described below with reference to FIGS. 1 and 2.

FIG. 1 is a diagrammatic, vertical sectional view showing a supporting mechanism part of a variable angle prism assembly according to the first embodiment of the present invention, and FIG. 2 is an exploded, perspective view diagrammatically showing an image stabilizing system which utilizes the variable angle prism assembly according to the first embodiment.

The variable angle prism shown in FIGS. 1 and 2 includes transparent plates 1a and 1b made of glass, plastic or the like, frames 2a and 2b to which the respective transparent plates 1a and 1b are bonded, reinforcing ring 3a and 3b for the respective frames 2a and 2b, a bellows-like film 4 for connecting the frames 2a and 2b and a hermetically enclosed transparent liquid 5 of high refractive index. The variable angle prism is clamped between frames 6a and 6b. The frames 6a and 6b are respectively supported by supporting pins 7a, 8a and 7b, 8b in such a manner as to be able to swing around a yaw axis (X—X) and a pitch axis (Y—Y), and the supporting pins 7a, 8a and 7b, 8b are fastened to a system fixing member which is not shown by means of screws. The yaw axis (X—X) and the pitch axis (Y—Y) extend orthogonally to each other in the central plane or approximately central plane (hereinafter referred to as "substantially central plane") of the variable angle prism.

A flat coil 9a is fixed to one end of the frame 6a located on a rear side, and a permanent magnet 10a and a yoke 11a and a yoke 12a are disposed in opposition to both faces of the flat coil 9a, thereby forming a closed magnetic circuit. A slit plate 13a having a slit is mounted on the frame 6a, and a light emitting element 14a and a light receiving element 15a are disposed on the opposite sides of the slit plate 13a so that a light beam emitted from the light emitting element 14a passes through the slit and illuminates the light receiving element 15a. The light emitting element 14a may be an infrared ray emitting device such as an iRED, and the light receiving element 15a may be a photoelectric conversion device, such as a PCD, whose output level varies depending on the position on the element 15a where a beam spot is formed by a received light beam. If the slit travels according to a swinging motion of the frame 6a between the light emitting element 14a and the light receiving element 15a which are fixed to the system fixing member, the position of the beamspot on the light receiving element 15a varies correspondingly, whereby the angle of the swinging motion of the frame 6a can be taken out as an electrical signal.

Image-shake detectors 16a and 16b are mounted on the system fixing member for detecting image shakes relative to yaw- and pitch-axis directions, respectively. Each of the image-shake detectors 16a and 16b is an angular velocity sensor, such as a vibration gyroscope which detects an angular velocity by utilizing the Coriolis force.

Although not shown, on the pitch-axis side of the variable angle prism assembly, there are likewise provided electromagnetic driving force generating means made up of a flat coil 9b, a permanent magnet 10b and yokes 11b, 12b and means for detecting the swinging angle of the frame 6b made up of a slit plate 13b as well as a light emitting element 14b and a light receiving element 15b. This pitch-axis side arrangement functions similarly to the above-described yaw-axis side arrangement.

An image-shake correcting operation carried out by the above-described arrangement will be sequentially described below. During a photographic operation of a photographic apparatus, if a motion is applied to the photographic apparatus by a cause such as a vibration of a hand holding the photographic apparatus, the image-shake detectors 16a and 16b supply signals indicative of their respective angular velocities to a control circuit 17. The control circuit 17 calculates by appropriate computing processing the amount of displacement of the apex angle of the variable angle prism that is required to correct an image shake due to the motion.

In the meantime, variations of the apex angle of the variable angle prism relative to the respective yaw- and pitch-axis directions are detected on the basis of the movements of the positions of beam spots formed on the light receiving surfaces of the corresponding light receiving elements 15a and 15b, the beam spots being respectively formed by light beams which are emitted by the light emitting elements 14a and 14b, pass through the slits of the slit plates 13a and 13b mounted on the frames 6a and 6b and illuminate the light receiving elements 15a and 15b. The light receiving elements 15a and 15b transmit to the control circuit 17 outputs corresponding to the amounts of the movements of the respective beam spots, i.e., the magnitudes of the variations of the apex angle of the variable angle prism relative to the respective yaw- and pitch-axis directions.

The control circuit 17 computes the difference between the magnitude of a target apex angle obtained from the calculated amount of the displacement described previously and the actual magnitude of the apex angle of the variable angle prism obtained at this point in time, and transmits the difference to the coil driving circuit 18 as a coil driving instruction signal. The coil driving circuit 18 supplies a driving current according to the coil driving instruction signal to the coils 9a and 9b, thereby generating driving forces due to electromagnetic forces, respective, between the coil 9a and the permanent magnet 10a and between the coil 9b and the permanent magnet 10b. The opposite surfaces of the variable angle prism swing around the yaw axis X—X and the pitch axis Y—Y, respectively, so that the apex angle coincides with the target apex angle.

In other words, the image-shake correcting device according to the first embodiment is arranged to perform image-shake correcting control by means of a feedback control system in which the value of a target apex angle of the variable angle prism, which is computed for the purpose of correcting an image shake, is employed as a reference signal and the value of an actual apex angle obtained at that point in time is employed as a feedback signal.

As is apparent from the above description, in accordance with the variable angle prism assembly according to the first embodiment of the present invention, it is possible to achieve the following advantages by locating the swinging centers of the opposite surfaces of the variable angle prism in such a manner that the swinging centers approximately coincide with the central plane of the variable angle prism.

(i) Since a driving load can be decreased, it is possible to reduce the size, weight and power consumption of driving means.

(ii) Since a side pressure at a bearing of a swinging-motion supporting part is decreased and variations of the side pressure are eliminated, it is possible to eliminate the influence of a frictional force accompanying a swinging motion and improve driving characteristics, and it is also possible to improve the durability of the bearing.

Figure 11:
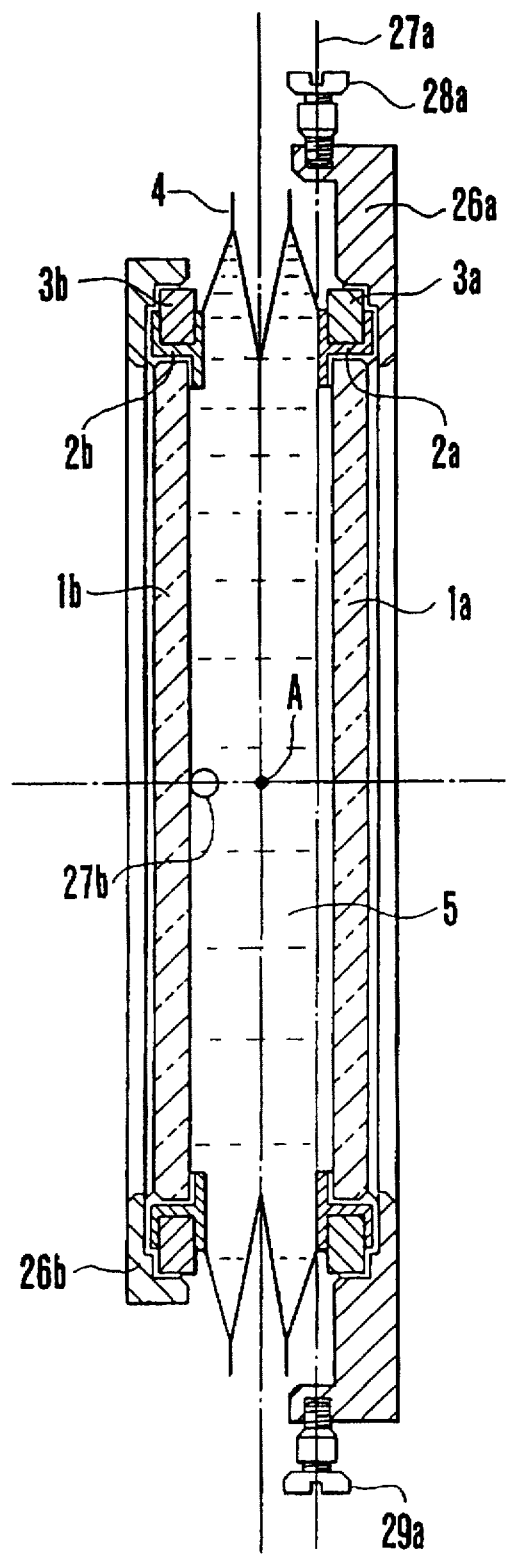
FIG. 11 is a diagrammatic, vertical sectional view showing the essential arrangement of a conventional variable angle prism assembly.
Figure 12:
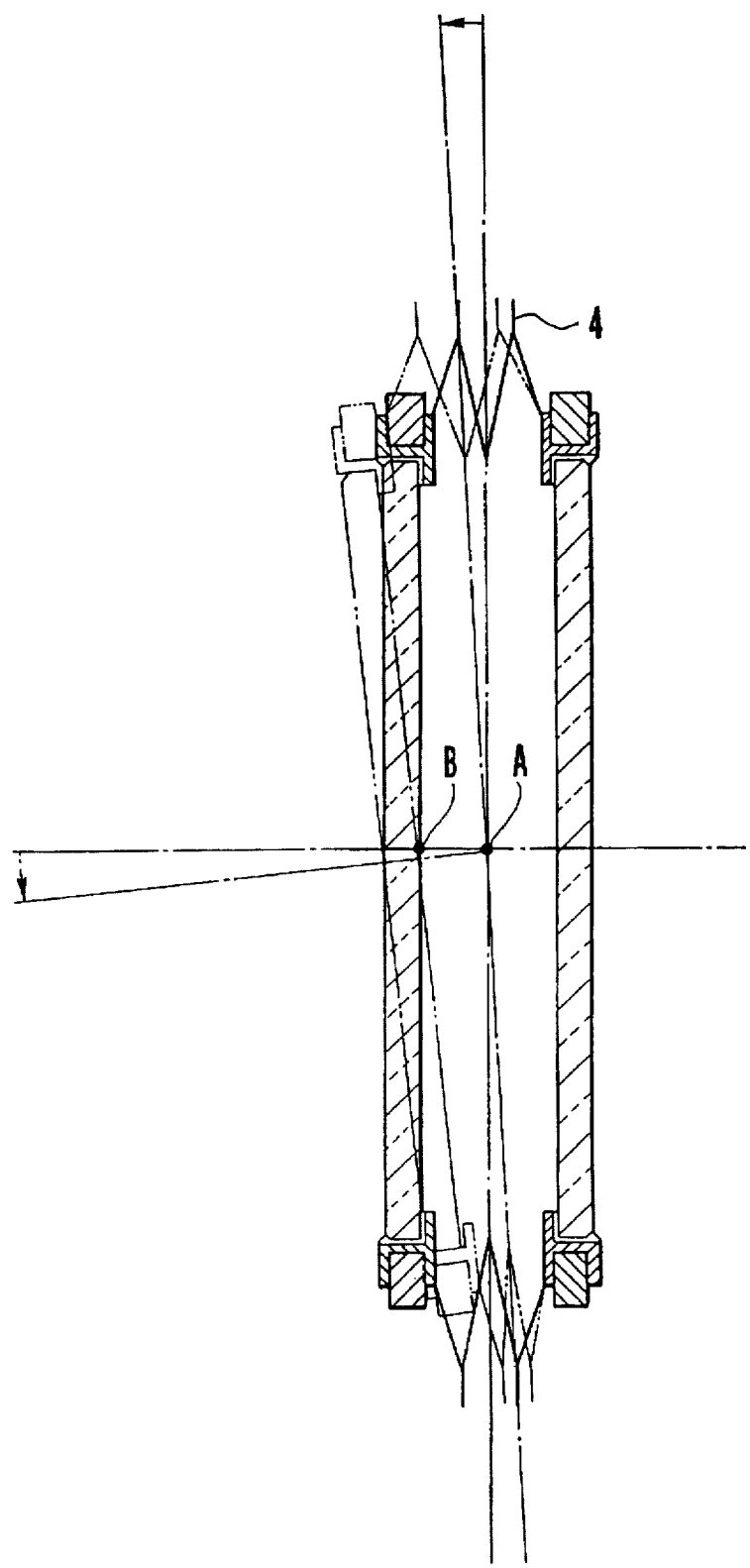
FIG. 12 is a view aiding in explaining the motion and deformation of the variable angle prism assembly shown in FIG. 11 when its apex angle is varied.

In the variable angle prism shown in FIGS. 11 and 12, as described previously, it is the most reasonable that the transparent plates 1a and 1b swing around swinging axes extending through a point A which is the mechanical center of the variable angle prism.

Figure 3A:
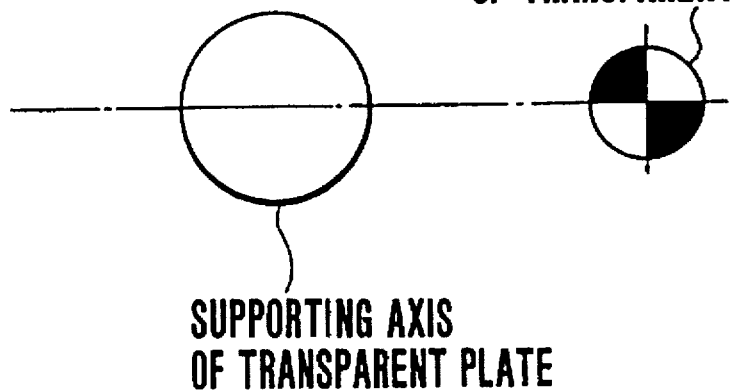
FIGS. 3(a) and 3(b) are views aiding in explaining the problems of a conventional image stabilizing system.
Figure 3B:
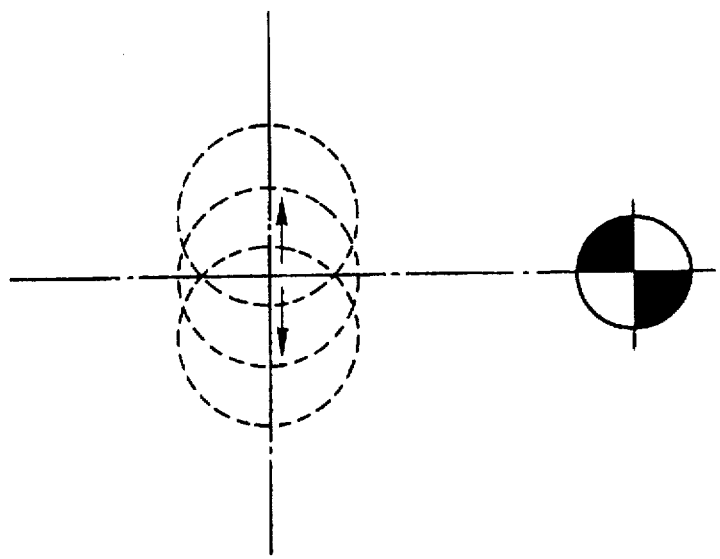

In this case, in the conventional variable angle prism assembly, as shown in FIGS. 3(a) and 3(b), a yaw axis 27a and a pitch axis 27b which are the supporting axes of the transparent plates 1a and 1b are displaced while drawing an arc about the point A. However, since the conventional variable angle prism assembly is supported on the yaw and pitch axes 27a and 27b by engagement with bearings, the bearings cause a serious loss of driving force and a great reduction in the performance of image stabilization (image-shake correction).

Figure 4:
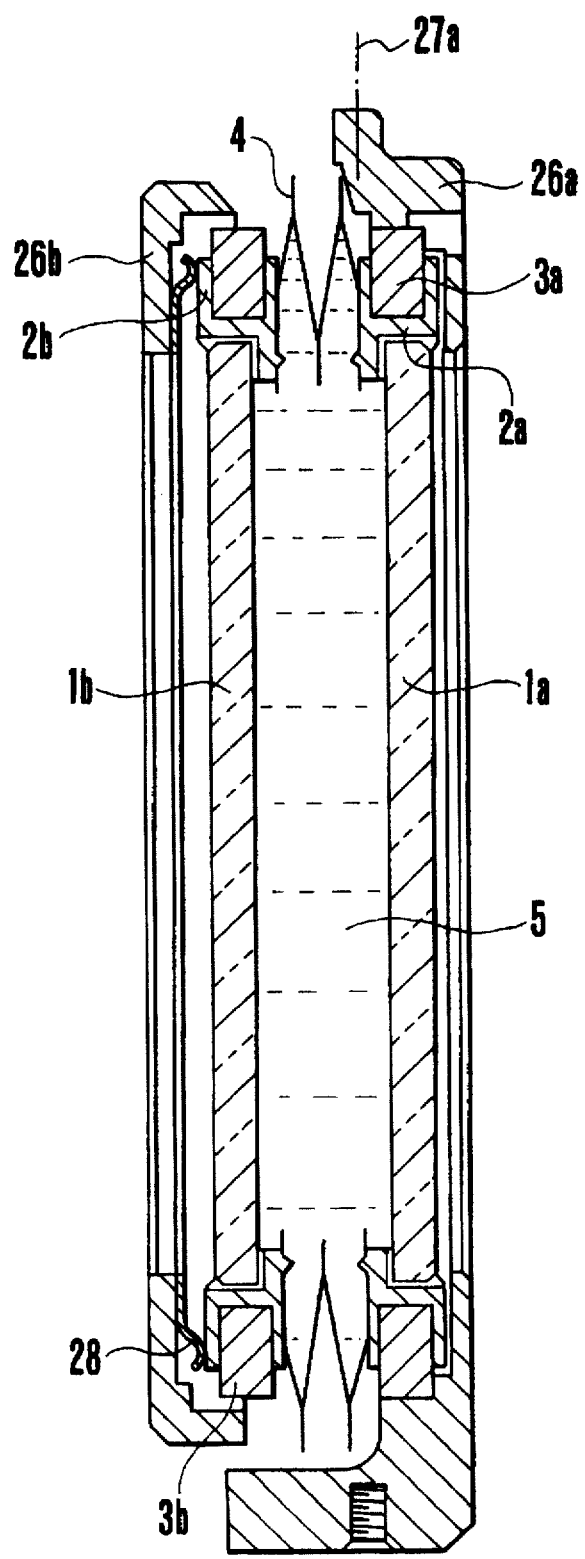
FIG. 4 is a diagrammatic, vertical sectional view showing the essential arrangement of a variable angle prism assembly according to a second embodiment of the present invention.
Figure 5:
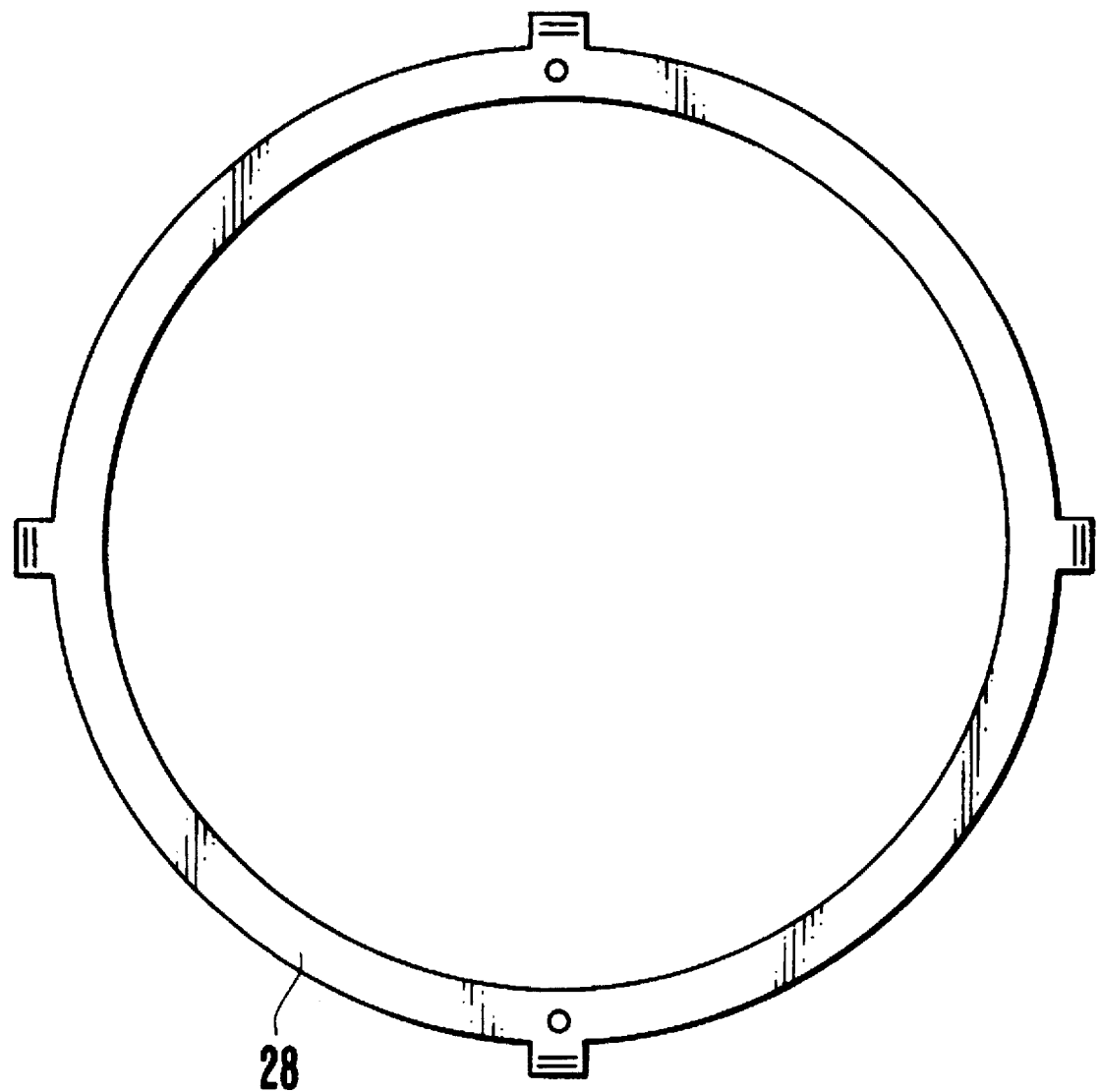
FIG. 5 is a front-side view of the elastic member shown in FIG. 4.

FIGS. 4 and 5 are schematic views showing a second embodiment of the present invention. FIG. 4 is a vertical sectional view showing the essential construction of a variable angle prism assembly according to the second embodiment, and FIG. 5 is a plan view of the elastic member shown in FIG. 4. In FIGS. 4 and 5, the same reference numerals are used to denote constituent elements similar to those shown in FIGS. 11 and 12. The second embodiment will be described below with reference to FIGS. 4 and 5.

Since the constituent elements 1 to 5, 26 and 27 are similar to those shown in FIG. 11 which shows the conventional variable angle prism assembly, description thereof is omitted in the following description.

The reinforcing ring 3a of the variable angle prism is held around its outer circumference by a holding frame 26a. The holding frame 26a and the reinforcing ring 3a are firmly fixed to each other, as by an adhesive or by simple clamping the reinforcing ring 3a inside the holding frame 26a.

A predetermined gap is provided between the reinforcing ring 3b and a holing frame 26b in such a manner that the reinforcing ring 3b can make a free motion in the radial direction within the holding frame 26b. An elastic member 28 is also provided between the frame 2b and the holding frame 26b in such a manner that each of the frame 2b and the holding frame 26b can be urged by the other in the direction of the optical axis.

FIG. 5 shows a front view of the elastic member 28.

The holding frame 26a is supported by a supporting shaft (not shown) in such a manner as to be able to swing around the yaw axis 27a, while the holding frame 26b is supported by a supporting shaft (not shown) in such a manner as to be able to swing around the pitch axis 27b which is 90 degrees out of phase with the yaw axis 27a.

A combination of a ball and a coiled spring may be substituted for the elastic member 28 so that the transparent plates 1a and 1b can move more easily.

According to the above-described second embodiment, a structure is adopted which allows at least one transparent plate of the variable angle prism to move in the radial direction within the associated holding frame with a predetermined degree of freedom, so that the transparent plate is capable of moving in the radial direction while being urged in the direction of the optical axis within the holding frame. Accordingly, even if the supporting axis of the holding frame does not pass through the center of the variable angle prism, it is possible to achieve the advantage of reducing loss of driving force at a bearing for supporting the holding frame. Therefore, it is possible to reduce the required driving force and also to prevent a lowering in image-shake correcting performance.

As described above, according to the second embodiment of the present invention, the elastic member for causing each of at least one transparent plate and the associated holding frame of image-shake correcting means to be urged by the other is provided between the transparent plate and the associated holding frame, whereby a predetermined degree of freedom is given to the radial motion of the transparent plate with respect to the holding frame.

Accordingly, it is possible to cancel loss of the driving force at the bearing for supporting the holding frame and also to prevent a lowering in image-shake correcting performance.

An image-shake correcting device using the conventional variable angle prism has not only the above-described problems but also problems which will be described below. By way of description of the problems, reference will be made to FIG. 6 which diagrammatically shows the construction of an image stabilizing system including the conventional variable angle prism, driving means for driving the conventional variable angle prism and detecting means for detecting the apex angle (the angle of rotation about the rotational axis) of the variable angle prism.

Figure 6:
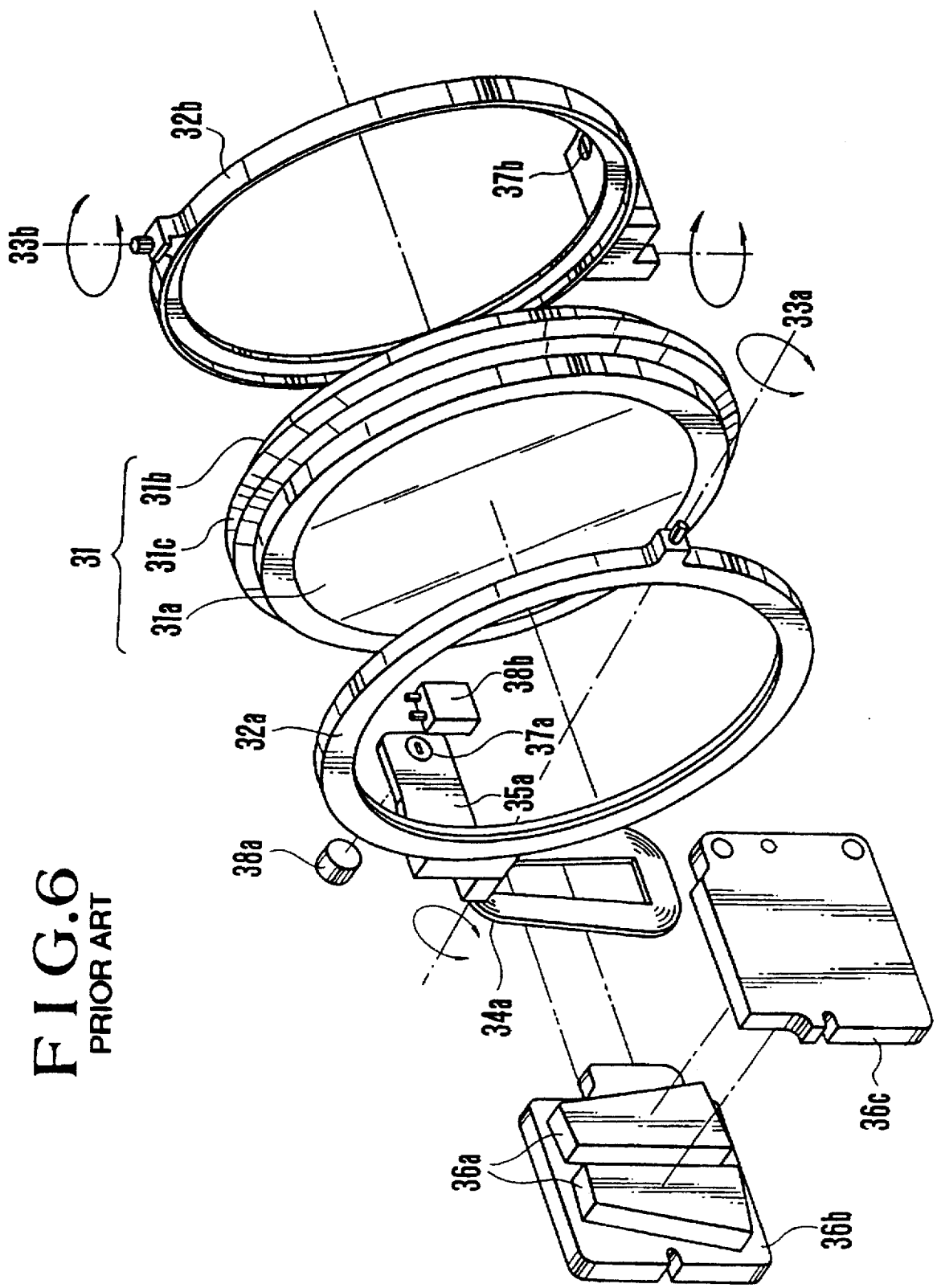
FIG. 6 is an exploded, perspective view diagrammatically showing the structure of a conventional image stabilizing system.

In the image stabilizing system shown in FIG. 6, a variable angle prism 31 includes a pair of transparent plates 31a and 31b which are spaced apart in face-to-face relation in the direction of the optical axis, a bellows member 31c for connecting the transparent plates 31a and 31b around their outer circumferences to form a sealed space therebetween, and a liquid 31d of predetermined refractive index charged into the sealed space.

The transparent plates 31a and 31b of the variable angle prism 31 are respectively held by frames 32a and 32b, and the frames 32a and 32b are supported by a lens barrel (not shown) in such a manner as to be able to swing around a pitch axis 33a and a yaw axis 33b, respectively. A flat coil (hereinafter referred to simply as "coil") 34a is fixed to one end of the frame 32a via a coil holding member 35a in such a manner as to extend downward from the pitch axis 33a, and a permanent magnet 36a, a yoke 36b and a yoke 36c are disposed to sandwich the coil 34a. The permanent magnet 36a, the yoke 36b and the yoke 36c form a closed magnetic circuit. The coil 34a, the permanent magnet 36a, the yoke 36b and the yoke 36c function as a driving mechanism for causing the frame 32a to swing around the pitch axis 33a. The coil holding member 35a is provided with a slit 37a. A light emitting element 38a and a light receiving element 38b are disposed in opposed relation on the opposite sides of the slit 37a, and function as rotational-angle detecting means for detecting the rotational angle of the frame 32a. More specifically, light emitted from the light emitting element 38a passes through the slit 37a and is made incident on the light receiving element 38b. The light emitting element 38a may be, for example, an infrared ray emitting diode, while the light receiving element 38b may be, for example, a photoelectric conversion device, such as a PCD, whose output level varies depending on the position on the element 38b where a beam spot is formed by an incident light beam.

Although an illustration is omitted, similar constituent elements are disposed with respect to the frame 32b, such as a coil holding member 35a having a slit 37a, a coil 34a, a permanent magnet 36a, a yoke 36b, a yoke 36c, a light emitting element 38a and a light receiving element 38b. Similarly, these constituent elements function as a driving mechanism for causing the frame 32b to swing around the yaw axis 33b, and as rotational-angle detecting means for detecting the rotational angle of the frame 32b.

Figure 7:
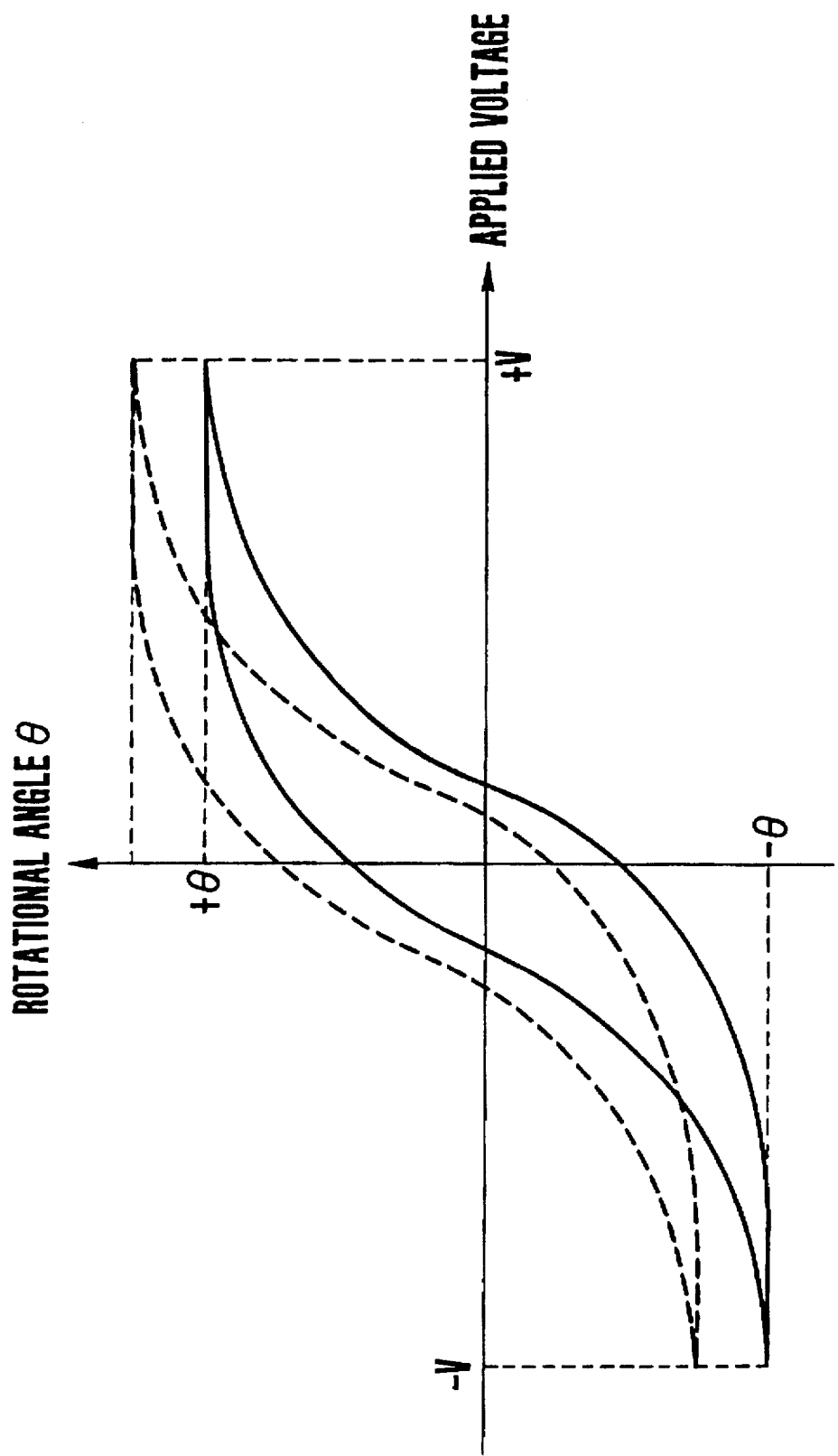
FIG. 7 is a graphic representation showing the driving characteristics of the variable angle prism of the conventional image stabilizing system.

The solid curves of FIG. 7 represent the relationship between a voltage applied to the coil 34a and a rotational angle θ of the transparent plate 31a or 31b of the variable angle prism driven by the above-described system.

Figure 8B:
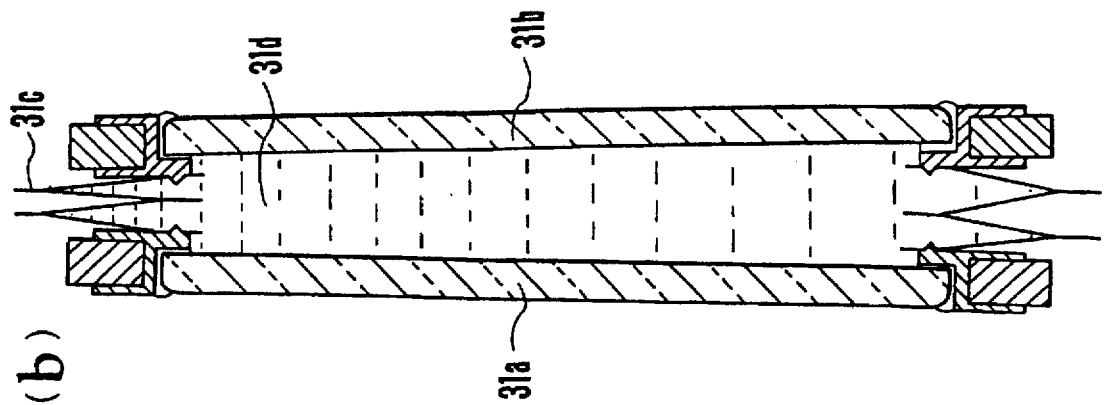
FIGS. 8(a) and 8(b) are diagrammatic, vertical sectional views showing the essential arrangement of the variable angle prism of the conventional image stabilizing system.
Figure 8A:
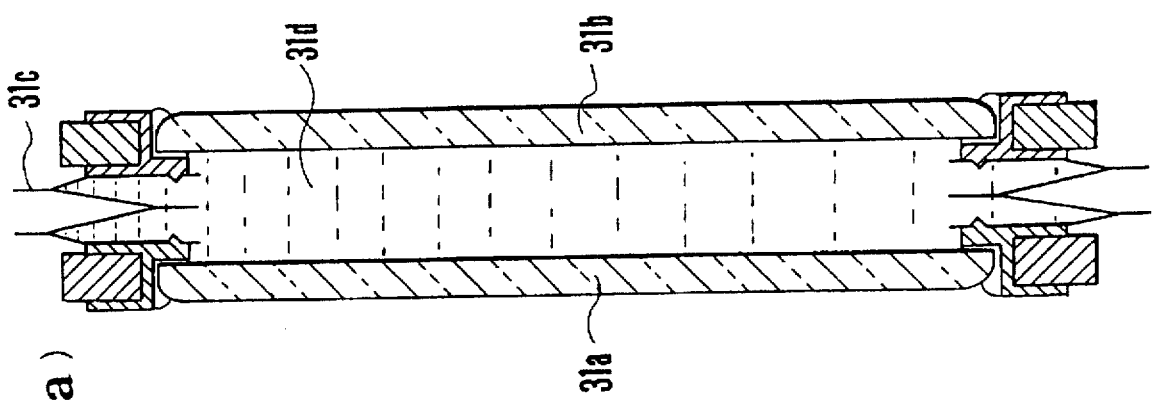

The rotational angle θ of the transparent plate 31a or 31b of the variable angle prism is selected to be zero at the instant when the transparent plates 31a and 31b are parallel to each other as shown in FIG. 8(a).

The characteristic shown by the solid curves of FIG. 7 has hysteresis because of the presence of mechanical looseness and friction around the rotational axis of the transparent plate 31a or 31b. As the rotational angle θ increases, the shown characteristic curves vary in slope owing to insufficiency of softness of the bellows member 31c or owing to a close contact between folded portions of the bellows member 31c.

AS is illustratively shown in FIG. 8(b), the transparent plate 31a or 31b often has a certain magnitude of rotational angle in its initial state owing to the presence of a bending angle of the bellows member 31c which connects the transparent plates 31a and 31b. As a result, even if a predetermined level of voltage is applied to the aforesaid coil 34a, it is impossible to obtain a proper rotational angle, thus leading to unbalance characteristics as show by dashed curves in FIG. 7. It is, therefore, impossible to effect accurate image-shake correction.

Figure 9:
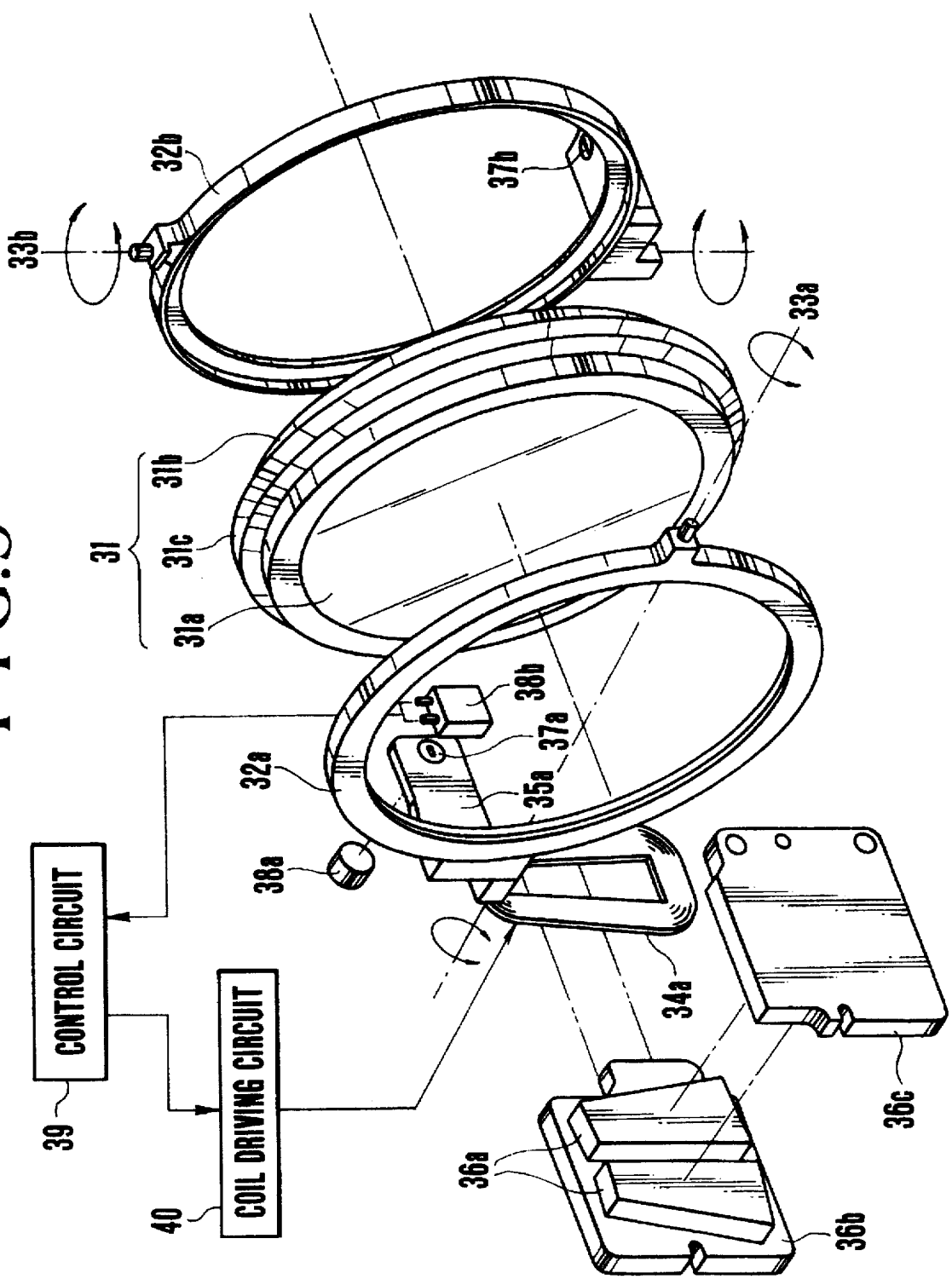
FIG. 9 is a diagrammatic, vertical sectional view showing the essential arrangement of an image stabilizing system according to a third embodiment of the present invention.

FIG. 9 schematically shows the construction of a third embodiment of the present invention, and in the figure the same reference numerals are used to denote constituent elements substantially identical to those shown in FIG. 6. In the following description, explanation of the constituent elements substantially identical to those shown in FIG. 6 is omitted, and only different constituent elements will be referred to below.

Referring to FIG. 9, a control circuit 39 is provided for controlling various kinds of operations of the image stabilizing system. In accordance with the flowchart of FIG. 10 which will be described later, the control circuit 39 reads a signal from the rotational-angle detecting means made up of the light emitting element 38a and the light receiving element 38b, and controls, on the basis of the read signal, voltage applied to the aforesaid coil 34a, that is, driving means, by means of a coil driving circuit 40.

Figure 10:
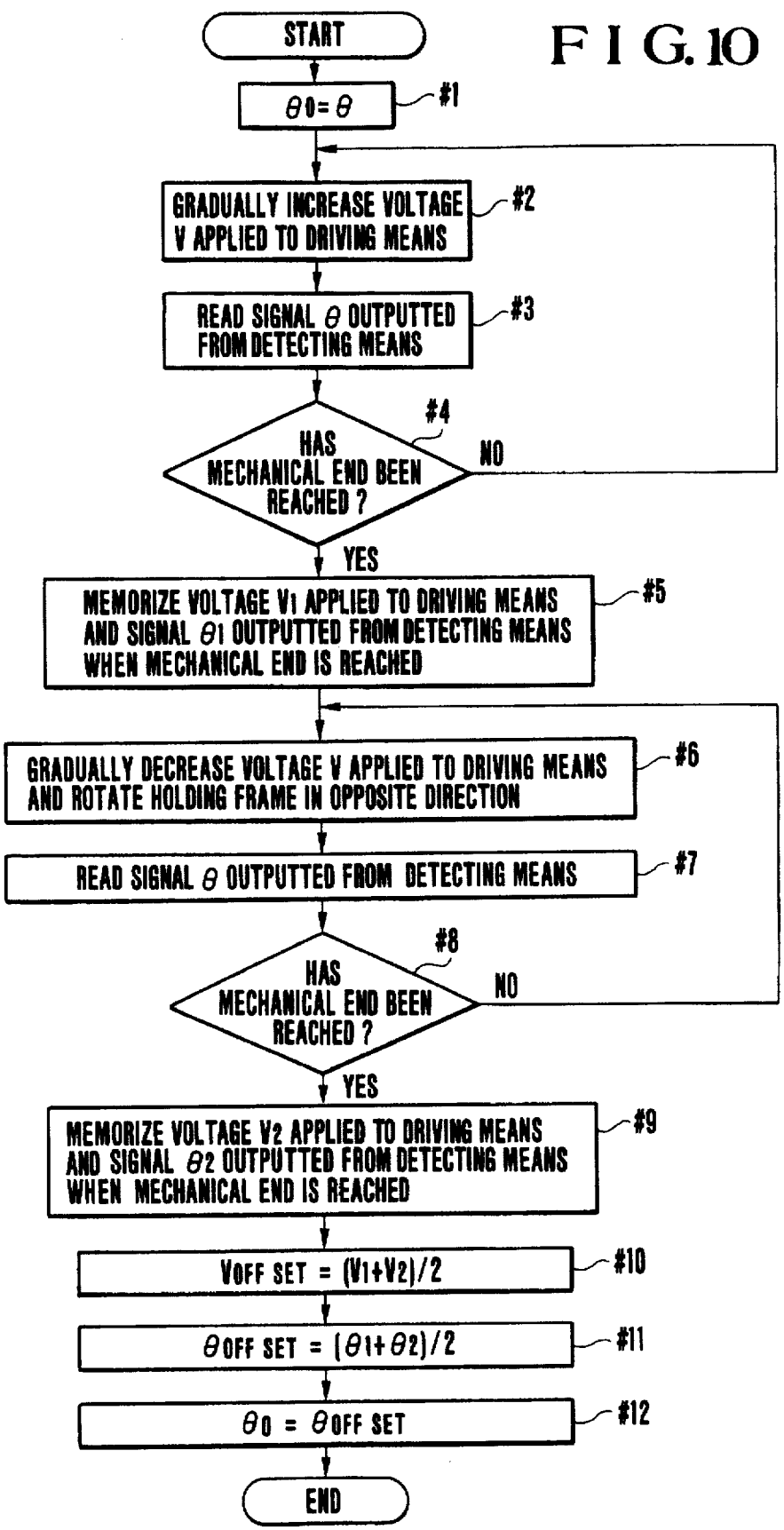
FIG. 10 is a flowchart showing essential operations controlled by the control circuit shown in FIG. 9.

FIG. 10 is a flowchart showing operations of parts of the control circuit 39 which are associated with the present invention, and the operations will be described below with reference to the flowchart.

[Step #1] An output signal of the rotational-angle detecting means for the holding frame 32a (32b) is read, and the read signal is set as an initial position $θ_0$.

[Step #2] Voltage is applied to the driving means (the coil 34a) through the coil driving circuit 40 while the voltage is being gradually increased.

[Step #3] An output sinal θ of the rotational-angle detecting means for the holding frame 32a (32b) is read.

[Step #4] From a variation of the output signal θ of the rotational-angle detecting means for the holding frame 32a (32b), it is determined whether the holding frame 32a (32b) has reached one of its mechanical ends. If the mechanical end has not been reached, the process returns to Step #2. If it is determined that the mechanical end has been reached, the process proceeds to Step #5.

[Step #5] A voltage $V_1$ which is applied to the driving means at the instant when the mechanical end is reached and a signal $θ_1$ which is outputted from the rotational-angle detecting means at the same instant, are read, and the voltage $V_1$ and the signal $θ_1$ are memorized.

[Step #6] The voltage V applied to the driving means is gradually decreased and the holding frame 32a (32b) is rotated in the opposite direction.

[Step #7] The output sinal θ of the rotational-angle detecting means for the holding frame 32a (32b) is read.

[Step #8] From a variation of the output signal θ of the rotational-angle detecting means for the holding frame 32a (32b), it is determined whether the holding frame 32a (32b) has reached the other mechanical end. If this mechanical end has not been reached, the process returns to Step #6. If it is determined that the mechanical end has been reached, the process proceeds to Step #9.

[Step #9] A voltage $V_2$ which is applied to the driving means at the instant when the mechanical end is reached and a signal $\theta_2$ which is outputted from the rotational-angle detecting means at the same instant, are read, and the voltage $V_2$ and the signal $\theta_2$ are memorized.

[Step #10] An offset voltage, that is, a voltage applied to the driving means for the purpose of equalizing the rotational angles of the holding frames 32a and 32b, is calculated.

[Step #11] The rotational angle of the holding frame 32a (32b) when the offset voltage calculated in Step #10 is applied is calculated.

[Step #12] The rotational angle of the holding frame 32a (32b) calculated in Step #11 is newly set as the initial position $\theta_0$ defined in Step #1, and the process is brought to an end.

In accordance with the third embodiment, a voltage is applied to the driving means so that each of the holding frames for holding the respective transparent plates of the variable angle prism is moved from one of the mechanical ends and the other and vice versa, and the rotational angle of the holding frame and the voltage applied to the driving means are memorized each time the holding frame reaches one of the mechanical ends. Then, a central rotational angle and the applied voltage which is required for the driving means to realize the central rotational angle are calculated from the memorized rotational angles and voltages. The calculated applied voltage is set as an offset voltage to be initially applied, and the central rotational angle calculated at this time is employed in later image-shake correction control as an initial position of the holding frame. Accordingly, it is possible to eliminate the unbalance characteristics of the rotational angles of the holding frames and provide an equivalent control range for the holding frames.

What is claimed is:

1. An image-shake correcting apparatus, comprising:
   a light deflecting device having two opposing members, a space forming member for forming a space between said two opposing members, and transparent liquid filling said space,
   said light deflecting device deflecting light passing therethrough by inclining at least one of said two opposing members; and
   a supporting member for supporting said light deflecting device, while allowing said at least one of said two opposing members to swing around an axis from which said two opposing members are substantially at a same distance.

2. An image-shake correcting apparatus according to claim 1, wherein the axis is positioned between said two opposing members, and is substantially orthogonal to an optical axis.

3. An image-shake correcting apparatus according to claim 1, wherein a first opposing member of said two opposing members is supported by a first supporting member in such a manner as to be able to swing around a first axis passing through a substantial center of said two opposing members, while a second opposing member of said two opposing members is supported by a second supporting member in such a manner as to be able to swing around a second axis passing through the substantial center of said two opposing members, said first and second axes being substantially orthogonal to each other.

4. An image-shake correcting apparatus according to claim 1, further comprising driving means for causing said at least one member to swing.

5. An image-shake correcting apparatus according to claim 1, wherein said supporting member comprises an arm portion extending from said at least one member to said axis.

6. An image-shake correcting apparatus according to claim 1, wherein said light deflecting device is a variable angle prism in which a space, formed by a pair of transparent plates which are said two opposing members and a deformable member for connecting said pair of transparent plates around their outer circumferences, is filled with said liquid.

7. A light deflecting device having two opposing members, a space forming member for forming a space between said two opposing members, and transparent liquid filling said space, said light deflecting device deflecting light passing therethrough by inclining at least one of said two opposing members, said device further comprising a supporting member for supporting said at least one of said two opposing members while allowing said at least one member to swing around an axis from which said two opposing members are substantially at a same distance.

8. An optical apparatus comprising:
   a light deflecting device having two opposing members, a space forming member for forming a space between said two opposing members, and transparent liquid filling said space, said light deflecting device deflecting light passing therethrough by inclining at least one of said two opposing members; and
   a supporting member for supporting said at least one of said two opposing members of said light deflecting device while allowing said at least one member to swing around an axis from which said two opposing members are substantially at a same distance.

9. An image-shake correcting apparatus comprising:
   a light deflecting device having two opposing members, a space forming member for forming a space between said two opposing members, and transparent liquid filling said space, said light deflecting device deflecting light passing therethrough by inclining at least one of said two opposing members; and
   a supporting device that supports said light deflecting device in such a manner that said at least one of said two opposing members is displaceable in a parallel plane of said at least one opposing member.

10. An apparatus according to claim 9, wherein said supporting device comprises means for supporting said at least one member of said two opposing members in such a manner that said at least one member is displaceable to a displacement different from the displacement in the parallel plane of said at least one member.

11. An apparatus according to claim 9, wherein said supporting device comprises means for supporting said light deflecting device such that said at least one of said two opposing member is slideably displaceable.

12. An apparatus according to claim 9, wherein said supporting device comprises elastic means for absorbing a displacement of said at least one of said two opposing members different from the displacement in the parallel plane of said at least one opposing member.

* * * * *

UNITED STATES PATENT AND TRADEMARK OFFICE
CERTIFICATE OF CORRECTION

PATENT NO. : 5,715,086
DATED : February 3, 1998
INVENTOR(S) : KAZUHIRO NOGUCHI, ET AL.

It is certified that error appears in the above-identified patent and that said Letters Patent is hereby corrected as shown below:

Column 1

Line 59, "prism the" should read --prism (The--.

Column 5

Line 24, "respective," should read --respectively,--.

Column 8

Line 8, "as show" should read --as shown--.
   Line 39, "sinal $\theta$" should read --signal $\theta$--.
   Line 56, "sinal $\theta$" should read --signal $\theta$--.

Column 10

Line 55, "member" should read --members--.

Signed and Sealed this

Sixth Day of October, 1998

Attest:

BRUCE LEHMAN

*Attesting Officer*   *Commissioner of Patents and Trademarks*